(12) United States Patent
Wang et al.

(10) Patent No.: US 9,092,073 B1
(45) Date of Patent: Jul. 28, 2015

(54) ADJUSTABLE POINTING DEVICE

(75) Inventors: Steven Wang, Windham, NH (US);
Scott H. Wakefield, Andover, MA (US);
William D. Chura, Newton, MA (US);
James H. Bleck, Chelmsford, MA (US);
Chad C. Terry, Lunenburg, MA (US);
Thomas Eagan, Chelmsford, MA (US);
John M. Aho, Lunenburg, MA (US);
Jonathan N. Towle, Amherst, NH (US);
Les Scenna, Wilton, NH (US)

(73) Assignee: CONTOUR DESIGN, INC., Windham, NH (US)

( * ) Notice: Subject to any disclaimer, the term of this patent is extended or adjusted under 35 U.S.C. 154(b) by 574 days.

(21) Appl. No.: 13/105,522

(22) Filed: May 11, 2011

Related U.S. Application Data (60) Provisional application No. 61/333,561, filed on May 11, 2010.

(51) Int. Cl.
*G06F 3/033* (2013.01)
*G06F 3/0354* (2013.01)
*G06F 3/0338* (2013.01)
*G06F 3/0346* (2013.01)
*G06F 3/03* (2006.01)

(52) U.S. Cl.
CPC .......... *G06F 3/03543* (2013.01); *G06F 3/0317* (2013.01); *G06F 3/0338* (2013.01); *G06F 3/0346* (2013.01); *G06F 2203/0332* (2013.01); *G06F 2203/0333* (2013.01); *G06F 2203/0334* (2013.01)

(58) Field of Classification Search
CPC . G06F 3/0362; G06F 19/3481; G06F 3/0346; G06F 3/0338; G06F 3/033; G06F 3/03543; G06F 2203/0333; G06F 2203/0332; G06F 2203/0334; G06F 3/0317
USPC ........ 112/470.04; 200/6 A; 307/9.1; 345/156, 345/157, 161, 163, 167, 173; 375/E7.026; 463/36, 37, 38, 39; 700/85; 901/15, 16
See application file for complete search history.

(56) References Cited

U.S. PATENT DOCUMENTS

| | | | | |
|---|---|---|---|---|
| 5,381,805 | A * | 1/1995 | Tuckett et al. | 600/552 |
| 5,555,894 | A * | 9/1996 | Doyama et al. | 600/595 |
| 6,396,232 | B2 * | 5/2002 | Haanpaa et al. | 318/568.11 |
| 6,525,714 | B1 * | 2/2003 | Varga et al. | 345/164 |
| 7,336,258 | B1 * | 2/2008 | Goetsch et al. | 345/163 |
| 8,314,772 | B1 * | 11/2012 | Coe | 345/163 |
| 2002/0033798 | A1 * | 3/2002 | Nakamura et al. | 345/156 |
| 2003/0058219 | A1 * | 3/2003 | Shaw | 345/161 |
| 2003/0214482 | A1 * | 11/2003 | Chen | 345/163 |
| 2004/0046732 | A1 * | 3/2004 | Chesters | 345/156 |

(Continued)

*Primary Examiner* — Michael J Eurice
(74) *Attorney, Agent, or Firm* — Lando & Anastasi, LLP (57) ABSTRACT

Methods and apparatus provide for an adjustable pointing device. The adjustable pointing device includes a base and an adjustable arm connecting a portion of the base with an input control portion. The input control portion includes at least one input control. A first end of the adjustable arm, which is distal from the base, allows for and independently maintains changes to various orientations of the input control portion. In other words, after the user adjusts the input control portion to be set at a new orientation, the first end of the adjustable arm maintains the input control portion at the new orientation as the user interacts with the adjustable pointing device. In addition, a second end of the adjustable arm, proximal to the base, also allows for and independently maintains changes in a distance between the input control portion and the base itself.

12 Claims, 5 Drawing Sheets

(56) References Cited

U.S. PATENT DOCUMENTS

| | | | |
|---|---|---|---|
| 2005/0162389 A1* | 7/2005 | Obermeyer et al. | 345/161 |
| 2005/0179661 A1* | 8/2005 | Bohn | 345/163 |
| 2008/0143693 A1* | 6/2008 | Schena | 345/179 |
| 2010/0265176 A1* | 10/2010 | Olsson et al. | 345/161 |
| 2011/0134031 A1* | 6/2011 | Wang et al. | 345/157 |

* cited by examiner

ADJUSTABLE POINTING DEVICE

PRIORITY TO PROVISIONAL APPLICATION

This U.S. Utility Patent Application claims the benefit of the filing date of earlier filed U.S. Provisional Application for patent having U.S. Ser. No. 61/333,561, filed May 11, 2010 entitled "Adjustable Pointing Device." The entire teaching, disclosure and contents of this provisional patent application are hereby incorporated by reference herein in their entirety.

BACKGROUND

In computing, a mouse is a pointing device that functions by detecting two-dimensional motion relative to its supporting surface. Physically, a mouse consists of an object held under one of the user's hands, with one or more buttons. The pointing device sometimes features other elements, such as "wheels", which allow the user to perform various system-dependent operations, or extra buttons or features can add more control or dimensional input. The mouse's motion typically translates into the motion of a pointer on a display, which allows for fine control of a Graphical User Interface (GUI).

Pointing devices such as a mouse, trackball, joystick, touchpad and the like have been the primary vehicle for users to control the movement of a cursor on a screen. Typically these pointing devices utilize a "point and click" sequence of moving the cursor to the desired position and depressing a button to select an action.

SUMMARY

Conventional mechanisms such as those explained above suffer from a variety of deficiencies. One such deficiency is that the shape and dimensions of conventional pointing devices cannot be modified (i.e. adjusted) according to the unique preferences of a particular user. In other words, conventional pointing devices do not allow a user to adjust the length of the pointing device, the width of the pointing device, the position of various input controls disposed on the pointing device and/or the position of various sections of the pointing device.

Embodiments of the invention significantly overcome such deficiencies and provide mechanisms and techniques that provide for a pointing device that has a plurality of sections (i.e. surfaces, portions, segments, panels) that can be moved, pulled, and/or titled so that the sections are repositioned—thereby changing the overall shape of the pointing device to better conform to a user's grip of the pointing device itself. Specifically, a user can adjust the pitch, yaw and/or roll of various sections of the pointing device via one or more adjustable arms wherein the various ends of the adjustable arms maintain the new pitch, yaw and/or roll as the user uses the pointing device.

In a particular embodiment of the pointing device disclosed herein, the pointing device includes a base and an adjustable arm connecting a portion of the base with an input control portion. The input control portion includes at least one input control, such as a depressible button(s) and/or a scroll wheel(s).

A first end of the adjustable arm, which is distal from the base, allows for and independently maintains changes to the pitch, yaw and/or roll of the input control portion. In other words, after the user adjusts the input control portion to be set at a new orientation, the first end of the adjustable arm maintains the input control portion at its new orientation (i.e. position) as the user interacts with the pointing device. In addition, a second end of the adjustable arm, proximal to the base, also allows for and independently maintains changes in a distance between the input control portion and the base itself.

The pointing device can also have multiple top surfaces that can be independently repositioned with regard to their respective pitch, yaw and roll in a similar manner. For example, a second surface, such as a palm rest of the pointing device, can be connected to the base via a second adjustable arm. Hence, the user can adjust the distance between the palm rest and the base via the second adjustable arm.

The base also has substantially vertical side surfaces, each connected to the base via a respective hinge. Each hinge allows for a substantially vertical side surface (side surface) to be "pulled away" from the base so that a distance between the base and a first edge of the side surface is modified. Such a modified distance is thereby maintained by the hinge as the user interacts with the pointing device.

A sensor is disposed in the base and aligned with an opening (i.e. aperture) in the base which allows for the passage of light emitted from the sensor. It is understood that in various embodiments, the aperture is compatible with any kind of motion sensing mechanism. The pointing device further includes a circuit in communication with the sensor. The circuit transmits data to a computer system regarding (i) movement of the base over a surface detected by the sensor and/or (ii) movement of the at least one input control—such as a user pressing down on a button or manipulating a scroll wheel. In another embodiment, the pointing device need not have an aperture, but rather can have a motion sensor disposed on the base.

It is understood that, in various embodiments, the adjustable arm(s) can be a connector, a ball joint, a friction joint, a cylindrical joint, a spherical ball joint, a planar frictional joint or a joint powered via an electric motor or a pneumatic system.

In various embodiments, each respective end of the adjustable arm can self-lock into a new position upon modification of its respective pitch, yaw and roll. In another embodiment, the adjustable arm can be a friction joint with a modifiable tension—thereby allowing the user to control how much force is required to change the adjustable arm's pitch, yaw and roll. In one embodiment, with respect to manipulating the adjustable arm, the force can be a compression force that modifies the friction in the friction joint—with a tension force being the actuation.

It is also understood that, in various embodiments, any movable, extendible, and/or adjustable section of the pointing device discussed herein can be motorized such that a user can manipulate a given section via software that controls a motor within the pointing device.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
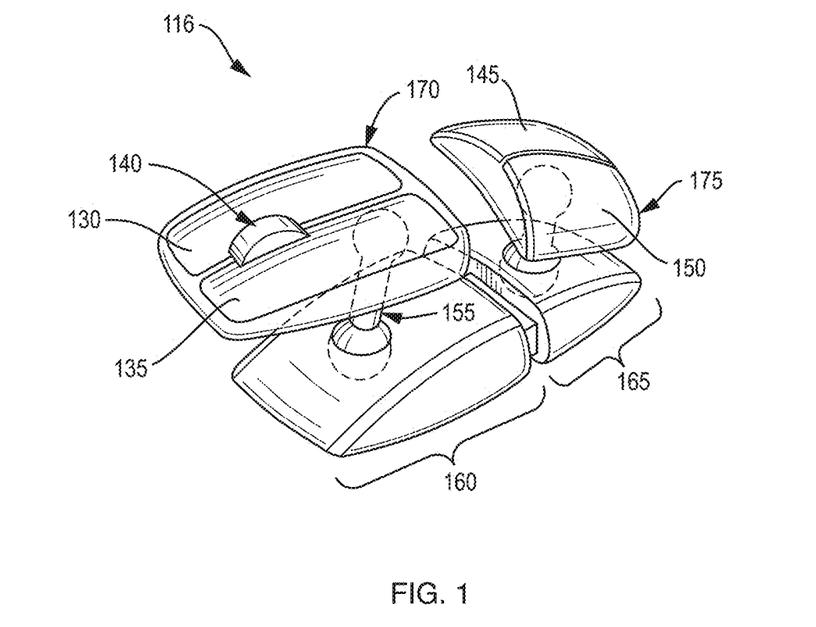
FIG. 1 comprises an isometric view diagram of a pointing device in accordance with embodiments of the invention.

FIG. 1 comprises an isometric view diagram of the pointing device 116 in accordance with embodiments of the invention. It is understood that the FIG. 1 illustrates the pointing device 116 without a right-side surface and a left-side surface. The pointing device 116 includes a base 165 having an aperture and an extendible section 160 generally extended along a horizontal axis to and from the base 165.

As illustrated in FIG. 1, the extendible section 160 has been "pulled away" from the base 165—thereby modifying the length of the pointing device 116. An adjustable joint 155 connects a portion of the first section 160 to a first top surface 170 (hereinafter the first section is referred to as an "extendible section" and the first top surface is referred to as an "adjustable key pad" or "key pad"). The adjustable key pad 170 includes a plurality of input controls such as depressible buttons 130, 135 and a scroll wheel 140.

A sensor, substantially aligned with the aperture, is disposed within the base 165 (or the extendible section 160) and a circuit is in communication with the sensor. The circuit is capable of transmitting data to a computer regarding (i) movement of the base 165 (or extendible section 160) over a surface detected by the sensor and/or (ii) movement of the depressible buttons 130, 135 and/or the scroll wheel 140. As already indicated, in other embodiments, the aperture can be part of the extendible section 160 and the sensor can be disposed within the extendible section 160 as well.

The adjustable joint 155 allows a user of the pointing device 116 to increase (and/or decrease) a distance between the extendible section 160 and the adjustable key pad 170. After the user repositions the pitch, yaw and roll of the adjustable key pad 170, the adjustable joint 155 maintains a current horizontal orientation of the adjustable key pad 170 with respect to an orientation of the base 165 and maintains a current vertical orientation of the adjustable key pad 170 with respect to the orientation of the base 165. In addition, the adjustable joint 155 maintains the distance between the adjustable key pad 170 and the extendible section 160 as the user uses the pointing device 116.

In one embodiment, a locking mechanism can be incorporated in the pointing device 116. The locking mechanism interacts with the adjustable joint 155 such that a user can operate the locking mechanism to lock a current orientation of the adjustable key pad 170 with respect to the orientation of the base 165. The user can also unlock the locking mechanism, thereby loosening the adjustable joint 155 so the user can yet again adjust the pitch, yaw and/or roll of the adjustable key pad 170.

The pointing device 116 further includes a second top surface 175 (hereinafter referred to as a "palm rest") positioned posterior to the adjustable key pad 170. A first segment 150 of the palm rest 175 can be attached to the base 165 via a second adjustable joint. It is noted that the second adjustable joint is similar to the adjustable joint 155 that connects the extendible section 160 and the adjustable key pad 170.

It is understood that the palm rest 175 itself can be divided into multiple segments such that the palm rest 175 can have a second segment 145 attached to the base 150 via yet another adjustable joint. Hence, between the adjustable key pad 170 and the palm rest 175, the pointing device 116 comprises multiple surfaces that can be repositioned and/or tilted—independent of each other—with regard to their respective pitch, yaw and/or roll.

In other embodiments the adjustable joint 155 can be connected to a portion of the base 165—as opposed to the extendible section 160. Further, the adjustable key pad 170 can have multiple edges and the adjustable joint 155 can be connected to the adjustable key pad 170 in a manner such that the adjustable joint 155 is closer to a particular edge than any other edges of the adjustable key pad 170.

Figure 2:
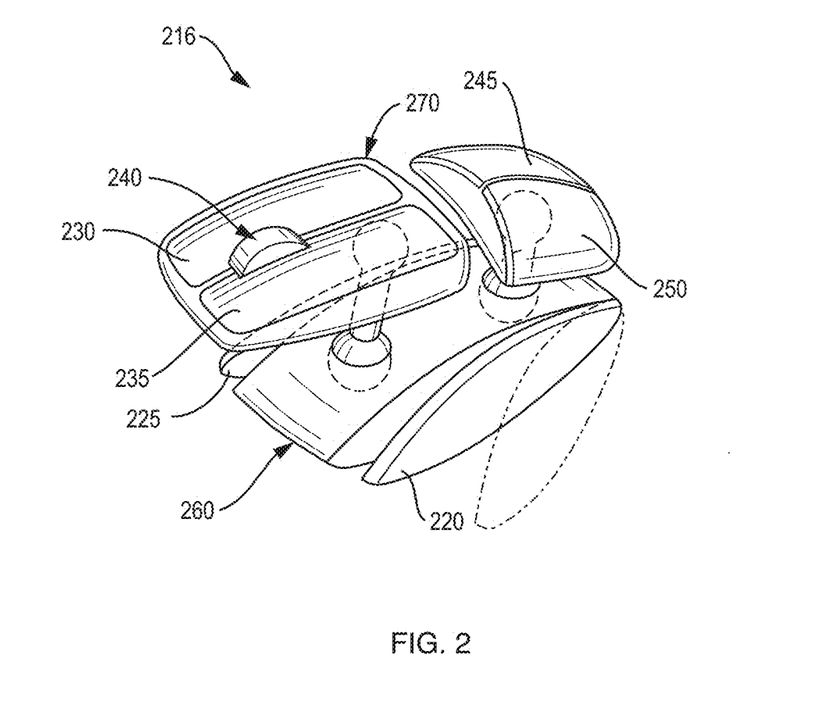
FIG. 2 provides a view of the pointing device in accordance with embodiments of the invention.

Referring now to FIG. 2, FIG. 2 provides a view of a pointing device 216. The pointing device 216 includes depressible buttons 230, 235 and a scroll wheel 240 disposed upon an adjustable key pad 270. The pointing device 216 includes a right-side surface 220 and a left-side surface 225. Both the right-side surface 220 and the left-side surface 225 are positioned generally perpendicular to a base 260 of the pointing device 216. The pointing device 216 also includes a palm rest that itself can be divided into multiple segments 245, 250. It is noted that in various embodiments, right-side surface 220 and left-side surface 225 can each individually slide forwards and/or backwards as well (or in any other direction).

Further, in various embodiments, the right-side surface 220 and the left-side surface 225 can be tilted in various directions such that their individual orientations can be modified with respect to their pitch, yaw and/or roll. In addition, the side surfaces 220, 225 can be pulled away from the pointing device 216 via a hinge and can be pulled vertically upward as well.

Figure 3:
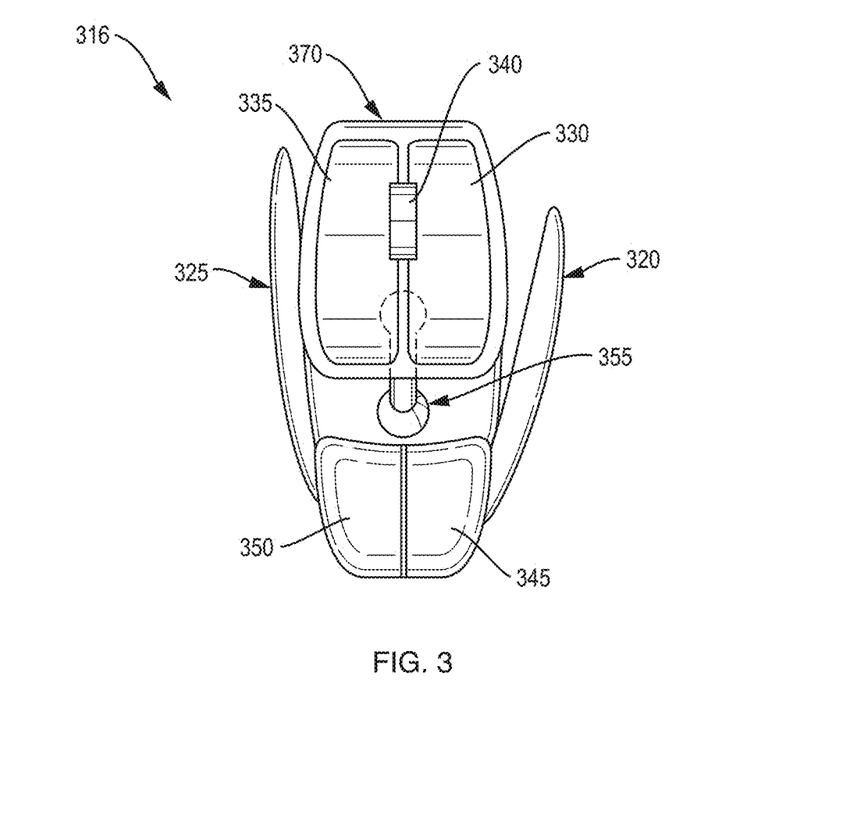
FIG. 3 provides another top view of the pointing device in accordance with embodiments of the invention.

FIG. 3 provides a top view of the pointing device 316. The pointing device 316 includes an adjustable joint 355 connecting the input control portion 370 to a base of the pointing device. The input control portion 370 has multiple input controls 330, 340, 335. The base is connected to substantially vertical side surfaces 320, 325 that can each be respectively pulled away from the base and maintain their respective positions as the user interacts with the pointing device 316. In addition, the pointing device includes an adjustable palm rest, which is made up of multiple adjustable surfaces 345, 350.

Figure 4:
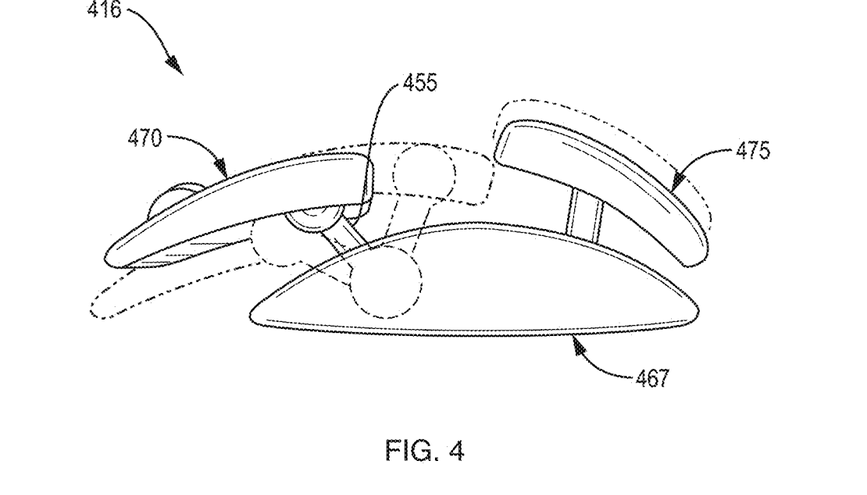
FIG. 4 comprises another side view of the pointing device in accordance with embodiments of the invention.

FIG. 4 comprises another side view of a pointing device 416 in accordance with embodiments of the invention. The pointing device 416 includes a base 467 connected to a platform 470 via an adjustable arm 455 As illustrated in FIG. 4, the platform 470 can be repositioned via manipulating the adjustable arm 455 (such as, for example, a dual ball joint). In addition, a palm rest 475 can be moved in a vertical (and/or horizontal) direction with respect to the base 467.

Figure 5:
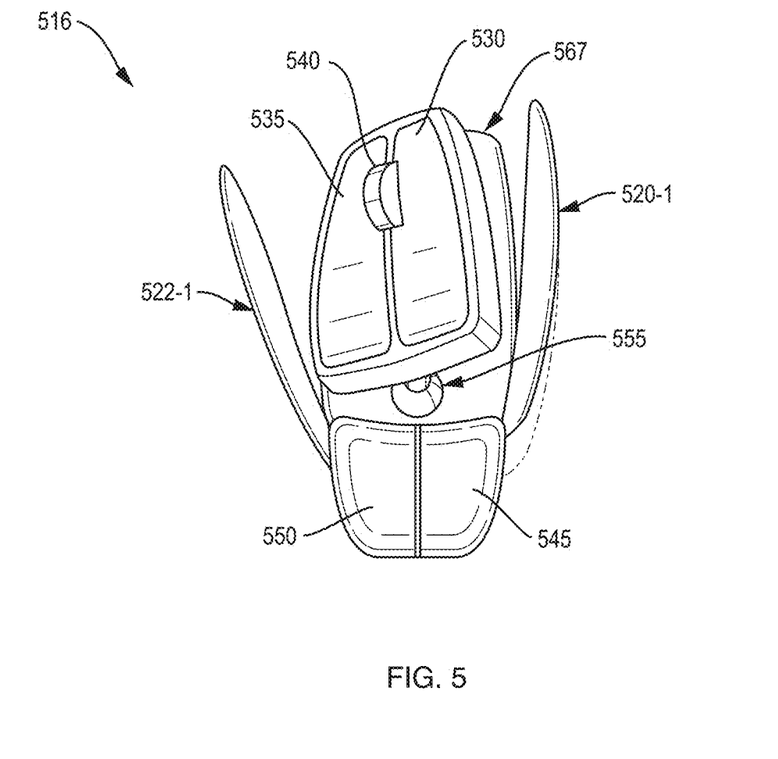
FIG. 5 provides yet another top view of the pointing device in accordance with embodiments of the invention.

FIG. 5 provides yet another top view of the pointing device 516 in accordance with embodiments of the invention. The pointing device 516 includes a right-side surface 520-1 that has been "pulled away" from the base 567 to add to the overall width of the pointing device 516. The pointing device 516 also includes a left-side surface 522-1 that has been "pulled away" from the base 567 to further add to the overall width of the pointing device 516. It is understood that both the right-side surface 520-1 and the left-side surface 522-1 are positioned generally perpendicular to the base 567. Both the right-side surface 520-1 and the left-side surface 522-1 are individually attached to the base 567 via respective swivels (or hinges).

Figure 6:
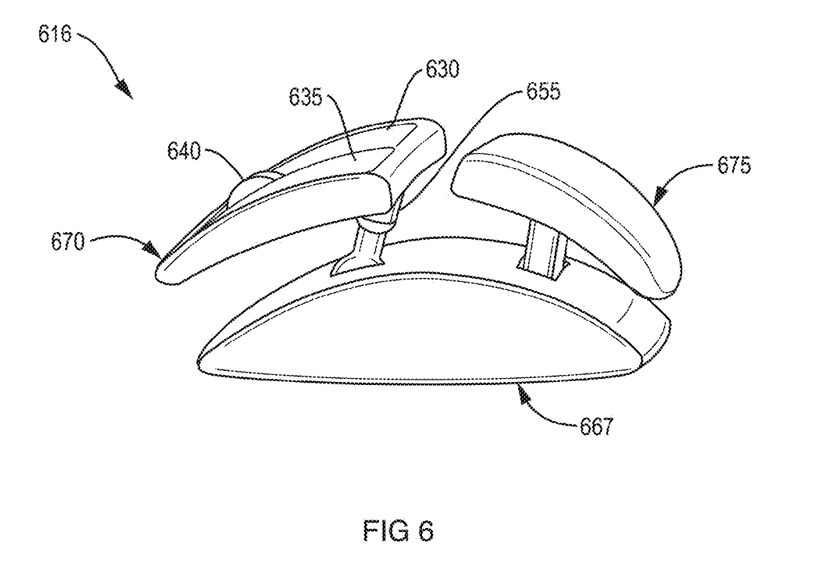
FIG. 6 comprises a diagram of the pointing device in accordance with embodiments of the invention.

FIG. 6 comprises a diagram of the pointing device 616 in accordance with embodiments of the invention. It is understood that FIG. 6 illustrates the pointing device 616 without a right-side surface 120 and without a left-side surface 125. The pointing device 616 includes a base 667 having an aperture. As illustrated in FIG. 6, connector 655 connects a portion of the base 667 to an adjustable input control portion 670. The adjustable input control portion 670 includes a plurality of input controls such as depressible buttons 630, 635 and a scroll wheel 640.

The connector 655 allows a user of the pointing device 616 to increase (and/or decrease) a distance between the base 667 and the adjustable input control portion 670. A first end, distal to the base 667, of the connector 655 maintains (i) a current horizontal orientation of the adjustable input control portion 670 with respect to an orientation of the base 667 and (ii) a current vertical orientation of the adjustable input control portion 670 with respect to the orientation of the base 667. The first end of the connector 655 further allows a user to adjust the pitch, yaw and roll of the adjustable input control portion 670 with respect to the orientation of the base 667. In one embodiment, the first end of the connector 655 can be self-locking in that it maintains the orientations of the adjustable input control portion's 670 respective pitch, yaw and roll after a user repositions the adjustable input control portion 670. A second end of the connector 655 further allows a the user to modify a distance between the base 667 and the adjustable input control portion 670. The second end of the connector 655 can be self-locking in that it maintains any changes made to the distance between the base 667 and the adjustable input control portion 670 as the user interacts with the pointing device 616. In addition, a palm rest 675 is connected to the base 667 via another connector, and the position of the palm rest 675 can be adjusted in any direction with respect to the orientation of the base 667. For example, in FIG. 6, the palm rest 675 is illustrated as having been "pulled away" (i.e. vertically) from the base 667.

Figure 7:
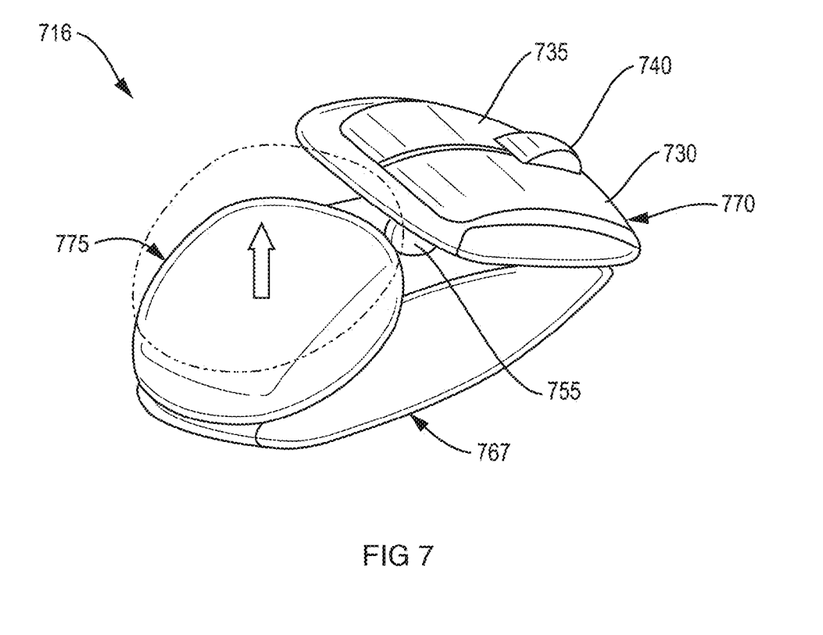
FIG. 7 comprises an off-set rear view of the pointing device in accordance with embodiments of the invention.

FIG. 7 comprises an off-set rear view of the pointing device 716 in accordance with embodiments of the invention. It is understood that FIG. 7 illustrates the pointing device 716 without a right-side surface 720 and without a left-side surface 725. The pointing device 716 includes a base 767 having an aperture.

An adjustable arm 755 connects a portion of the base 767 to an adjustable key pad 770. The adjustable key pad 770 includes a plurality of input controls such as depressible buttons 730, 735 and a scroll wheel 740. The adjustable arm 755 allows a user to adjust (i) a current horizontal orientation of the adjustable key pad 770 with respect to an orientation of the base 767 and (ii) a current vertical orientation of the adjustable key pad 770 with respect to the orientation of the base 767.

After the user has adjusted the pitch, yaw and roll of the adjustable key pad 770 such that the adjustable key pad 770 is tilted with respect to the orientation of the base 767, a first end of the adjustable key pad 770 in contact with the adjustable arm 755 maintains the "tilt" of the adjustable key pad 770 as the user uses the pointing device 116. In addition, a second end of the adjustable arm 755 maintains any changes made to the distance between the adjustable key pad 770 and the base 767 as the user modifies a current position of the adjustable arm 755.

Figure 8:
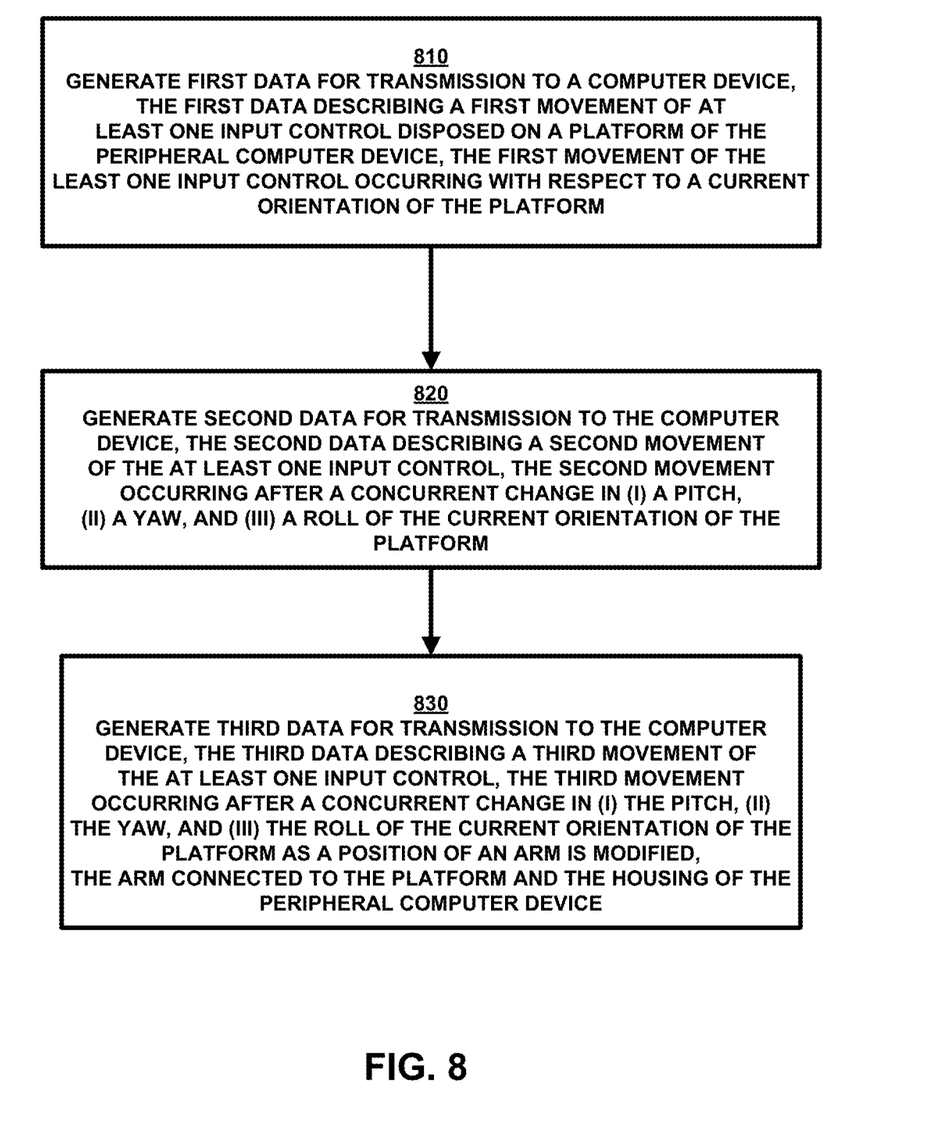
FIG. 8 is a flowchart of an example of processing steps performed by a circuit in a peripheral computer device in accordance with embodiments herein.

FIG. 8 is a flowchart of an example of processing steps performed by a circuit in a peripheral computer device in accordance with embodiments herein.

At step 810, the circuit generates first data for transmission to a computer device. The first data describes a first movement of at least one input control disposed on a platform of the peripheral computer device. The first movement of the least one input control occurs with respect to a current orientation of the platform.

At step 820, the circuit generates second data for transmission to the computer device. The second data describes a second movement of the at least one input control. The second movement occurs after a concurrent change in (i) a pitch, (ii) a yaw, and (iii) a roll of the current orientation of the platform. A first end of an arm allows for and maintains the change in the (i) pitch, (ii) yaw, and (iii) roll of the platform.

At step 830, the circuit generates third data for transmission to the computer device. The third data describes a third movement of the at least one input control. The third movement occurs after a concurrent change in (i) the pitch, (ii) the yaw, and (iii) the roll of the current orientation of the platform as a position of the arm is modified, where the arm is connected to the platform and the housing of the peripheral computer device. A second end of the arm allows for and maintains the change in the position of the arm.

In another embodiment(s), the pointing device, as disclosed herein, provides for a mouse button assembly attached to a palm rest via sliding rails that allow a position of the palm rest to be extendibly adjusted to and locked at various positions. The palm rest is also attached to an adjustable arm which to allow for adjustment of its pitch, yaw and roll. In addition, an orientation of the button assembly can be adjusted to be tilted upwards and downwards by way of a hinge at the base of each respective button.

In yet another embodiment(s), the pointing device's button assembly attaches to an adjustable arm, which is attached to the base at one end and has a simple hinge mechanism that can be locked. The adjustable arm is extendible, rotatable and can be locked at various positions.

Unless otherwise stated, use of the word "substantially," "general" and "generally" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

The invention claimed is:

1. An adjustable pointing device comprising:
   a base having an aperture, the base comprising an extendible section configured to mechanically extend away from the base;
   a first adjustable joint having a proximal end connected to the extendible section and a distal end connected to an input control portion, wherein the proximal end of the first adjustable joint provides for movement of the proximal end of first adjustable joint with respect to the extendible section and also maintains an adjustment of a current position of the proximal end of the first adjustable joint with respect to the extendible section, and wherein the distal end of the first adjustable joint provides for movement of the input control portion with respect to the distal end of the first adjustable joint in any of pitch, roll and yaw and also maintains an adjustment of a current orientation of the input control portion with respect to the distal end of the first adjustable joint;
   the input control portion including at least one input control mechanism and at least one switch configured to detect actuation of the at least one input control mechanism;
   a sensor disposed in the base that senses movement of the base over a surface, the sensor being substantially aligned with the aperture;
   a circuit in communication with the sensor and in communication with the at least one switch of the input control portion, the circuit capable of transmitting data regarding sensed movement of the base over the surface and movement of the at least one input control mechanism;
   the base further comprising generally vertically-oriented side surfaces, each generally vertically-oriented side surface arranged to be capable of being pulled away from the base, each generally vertically-oriented side surface comprising a first end and a second end, each second end being connected to the base via a connection disposed between the respective second end and the base, each connection being configured to maintain an adjustment of a current distance between the base and the respective first end of the respective side surface; and
   a hand palm-rest portion including a second adjustable joint that has a proximal end connected to the base portion and a distal end connected to the hand palm-rest portion that maintains an adjustment of a vertical distance between the base and the hand palm-rest portion, the hand palm-rest portion being discontiguous from the input control portion.

2. The adjustable pointing device of claim 1, wherein the first adjustable joint comprises:
   a securely-adjustable end that accommodates for movement of the first adjustable joint to either of (i) increase a current distance between the input control portion and a portion of the extendible section; and (ii) decrease a current distance between the input control portion and a portion of the extendible section.

3. The adjustable pointing device of claim 1, wherein the adjustment of the current orientation of the input control portion comprises a concurrent change of any of (i) the pitch, (ii) the roll and (iii) the yaw of the input control portion.

4. The adjustable pointing device of claim 1, wherein the distal end of the adjustable joint allows a user to adjust at least one from a group consisting of:
   (i) a current horizontal orientation of the input control portion with respect to an orientation of the extendible section and (ii) a current vertical orientation of the input control portion with respect to the orientation of the extendible section.

5. The adjustable pointing device of claim 1, wherein the at least one generally vertically-oriented side surface of the base comprises:
   a generally vertically-oriented right side surface of the base; and
   a generally vertically-oriented left side surface of the base.

6. The adjustable pointing device of claim 1:
   wherein the adjustment of the current position of the first adjustable joint comprises a modification of a current angle between the input control portion and a surface of at least a portion of the extendible section; and
   wherein the adjustment of the current orientation of the input control portion comprises a concurrent change of (i) the pitch, (ii) the roll and (iii) the yaw of the input control portion with respect to the extendible section.

7. The adjustable pointing device of claim 1, wherein the at least one input control mechanism consists of a first depressible button, a second depressible button, and a scroll wheel.

8. The adjustable pointing device of claim 1, wherein the at least one generally vertically-oriented side surface is also arranged to be capable of being moved vertically with respect to the base.

9. The adjustable pointing device of claim 1, wherein the first adjustable joint provides for adjustment of the distance between the input control portion and the extendible section and for maintaining the adjusted distance.

10. The adjustable pointing device as in claim 1, wherein the first end of the second adjustable joint preserves a concurrent adjustment of any of (i) a pitch, (ii) a yaw and (iii) a roll of the hand palm rest portion.

11. The adjustable pointing device of claim 1, wherein the adjustment of the current position of the first adjustable joint comprises modifying of a current angle between the input control portion and a surface of at least a portion of the extendible section.

12. The adjustable pointing device of claim 11, wherein at least a portion of the first adjustable joint is visibly exposed between the input control portion and the extendible section.

* * * * *